(12) United States Patent  
Yukawa et al.

(10) Patent No.: US 11,878,545 B2  
(45) Date of Patent: Jan. 23, 2024

(54) CARD MANUFACTURING METHOD

(71) Applicant: ZUIKO CORPORATION, Osaka (JP)

(72) Inventors: Tomoki Yukawa, Osaka (JP); Kazuki Gotou, Osaka (JP)

(73) Assignee: ZUIKO CORPORATION, Osaka (JP)

( * ) Notice: Subject to any disclaimer, the term of this patent is extended or adjusted under 35 U.S.C. 154(b) by 413 days.

(21) Appl. No.: 17/427,139

(22) PCT Filed: Dec. 16, 2019

(86) PCT No.: PCT/JP2019/049115  
§ 371 (c)(1),  
(2) Date: Jul. 30, 2021

(87) PCT Pub. No.: WO2020/162045  
PCT Pub. Date: Aug. 13, 2020

(65) Prior Publication Data  
US 2022/0097992 A1 Mar. 31, 2022

(30) Foreign Application Priority Data  
Feb. 8, 2019 (JP) ................................ 2019-021291

(51) Int. Cl.  
*B42D 25/48* (2014.01)  
*B42D 25/475* (2014.01)  
*B42D 25/45* (2014.01)  
*G06K 19/077* (2006.01)

(52) U.S. Cl.  
CPC ............. *B42D 25/48* (2014.10); *B42D 25/45* (2014.10); *B42D 25/475* (2014.10); *G06K 19/07773* (2013.01)

(58) Field of Classification Search  
CPC ....... B42D 25/48; B42D 25/45; B42D 25/475  
See application file for complete search history.

(56) References Cited

FOREIGN PATENT DOCUMENTS

| CA | 2234133 A1 | * 10/1998 |
|---|---|---|
| JP | 05-105320 A | 4/1993 |
| JP | 07-276497 A | 10/1995 |
| JP | 11-309969 A | 11/1999 |

(Continued)

OTHER PUBLICATIONS

International Search Report for corresponding Application No. PCT/JP2019/049115, dated Mar. 3, 2020.

*Primary Examiner* — Jeffry H Aftergut  
(74) *Attorney, Agent, or Firm* — Renner, Otto, Boisselle & Sklar, LLP

(57) ABSTRACT

A card manufacturing method includes feeding a reference sheet serving as a reference for alignment; feeding a first continuous sheet having a plurality of patterns repeatedly printed as one cycle thereof; producing a laminated sheet by laminating the first continuous sheet on the reference sheet; successively detecting a position of each one of the repeatedly printed patterns by detection means; adjusting such that the patterns are at predetermined positions with respect to the reference sheet by controlling a feeding speed of the first continuous sheet according to a detection result on the positions of the patterns; and producing a card by cutting the laminated sheet for each of the patterns, the patterns being printed so that plural patterns are repeatedly printed as one cycle, the adjustment being performed for each cycle made up of the plurality of patterns.

8 Claims, 5 Drawing Sheets

(56) References Cited

FOREIGN PATENT DOCUMENTS

| | | | |
|---|---|---|---|
| JP | 2008-279631 A | 11/2008 | |
| JP | 2008-308322 A | 12/2008 | |
| WO | WO-97/03466 A1 * | 1/1997 | |

* cited by examiner

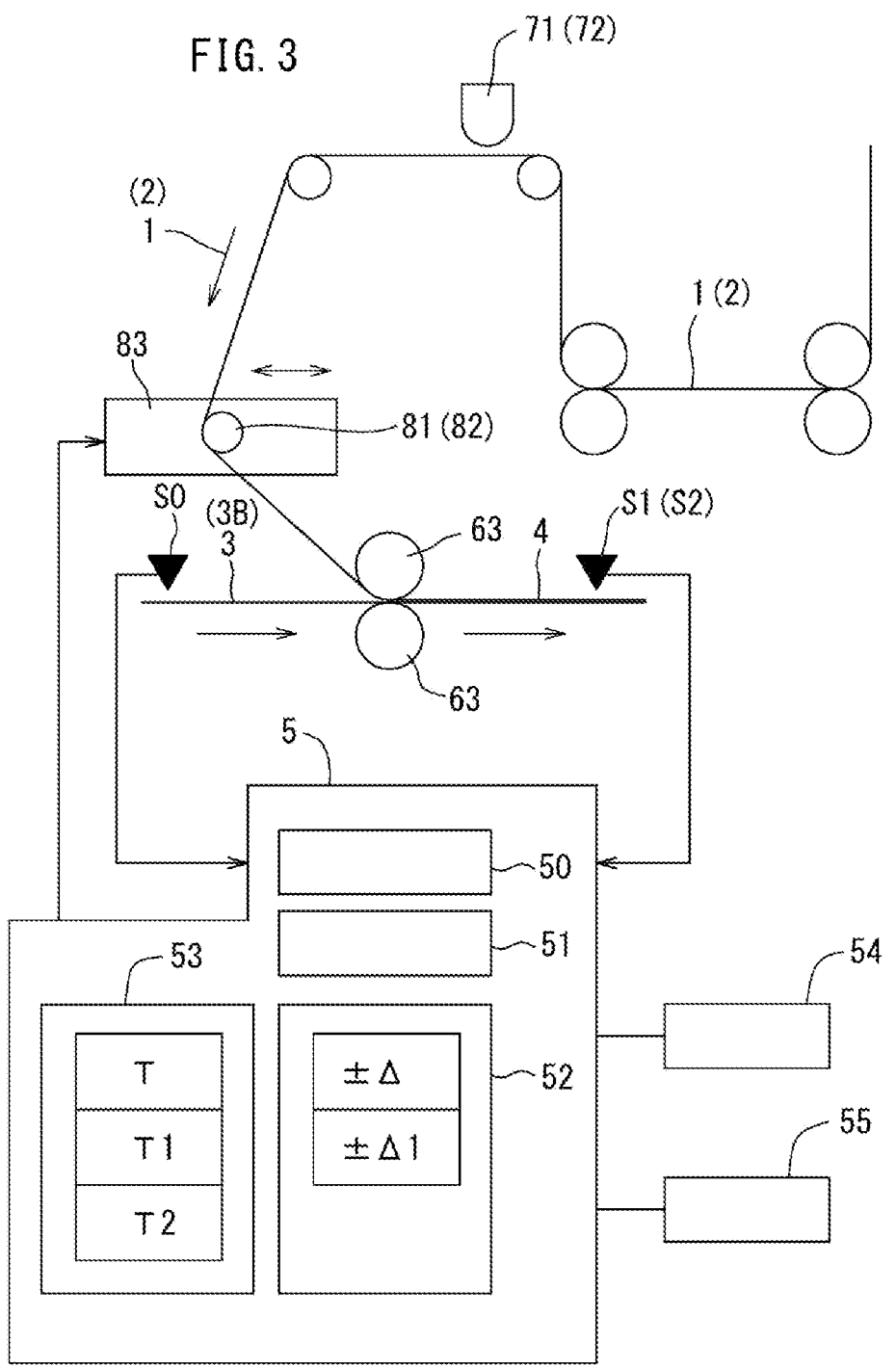

CARD MANUFACTURING METHOD

TECHNICAL FIELD

The present invention relates to a method for manufacturing various kinds of cards.

BACKGROUND ART

Non-contact IC cards have been used as a cash card, an employment photo ID, a work pass, a membership card, a student ID, an alien registration certificate, and driving licenses. These cards are formed by laminating a pattern-printed front sheet and a pattern-printed back sheet on an inlay. Inlay is a film on which a circuit is printed. In the circuit, electronic information is recorded.

The inlay and continuous sheets that are to be the front sheet and back sheet are adjusted in their relative positions, and then are cut in individual card units.

CITATION LIST

Patent Document

[FIRST PATENT DOCUMENT] JPH11-309969 A (Abstract)

The positional adjustment between the inlay and the continuous sheets is carried out by detecting respective marks on the inlay and the continuous sheets and adjusting the pattern on the continuous sheets with respect to the inlay. The mark is called registration mark.

SUMMARY OF INVENTION

FIG. 1B shows a printing machine 100 that prints patterns on the continuous sheet 200. As shown in FIG. 1B, the single printing machine 100 is provided with number n (several) of printing plates 101 to 106 on the roll body 110 at roughly equal angle pitch. There is a technique that is able to easily manufacture the printing plates 101 to 106 so as to be the same form. With this technique, patterns printed by the plates are the same.

Due to the structure where the printing plates 101 to 106 are attached to the roll body 110, it is inevitable that each plate is slightly misaligned when attached. Thus, pitches between the printed patterns are slightly unequal. Positional adjustment per every single pattern may not be good enough for a pattern adjustment control. In addition, it is difficult to manufacture cards at high-speed.

The present invention is to provide a method for manufacturing cards in which it is easy to adjust patterns while manufacturing cards at high-speed.

The card manufacturing method of the present invention includes:
  a step of feeding a reference sheet 3 serving as a reference (a basis) for alignment;
  a step of feeding a first continuous sheet 1 having a plurality of (a group of) patterns repeatedly printed on the first continuous sheet 1, the plurality of patterns seen as one cycle as a whole;
  a step of producing a laminated sheet 4 by laminating the first continuous sheet 1 on the reference sheet 3;
  a step of successively detecting a position of each one of the repeatedly printed patterns by detection means;
  a first adjustment step of adjusting such that the patterns are at predetermined positions with respect to the reference sheet 3 by controlling a feeding speed of the first continuous sheet 1 according to a detection result on the positions of the patterns; and
  a step of producing a card 40 by cutting the laminated sheet 4 for each of the patterns,
  the first adjustment step being performed for each cycle made up of the plurality of patterns.

In the present invention, plural patterns, as one cycle, are repeatedly printed on the first continuous sheet 1; and the feeding speed of the first continuous sheet 1 is controlled based on the detection result of the position of patterns at every one cycle. Thus, if the pitches between the printing plates are unequal in printing, it is possible to control so that the pattern is placed at a predetermined position with respect to the reference sheet 3 without bothered by the unequal pitches.

Also, the adjustment at every one cycle is efficient, and is easy to deal with high-speed manufacturing.

In the present invention, "pattern" includes letters, code, symbol, figure, painting, illustration, and registration mark. Typically, registration marks are used in the position detection of pattern.

BRIEF DESCRIPTION OF THE DRAWINGS

FIG. 3 is a schematic configuration diagram showing a control system.

DESCRIPTION OF EMBODIMENTS

Figure 1:
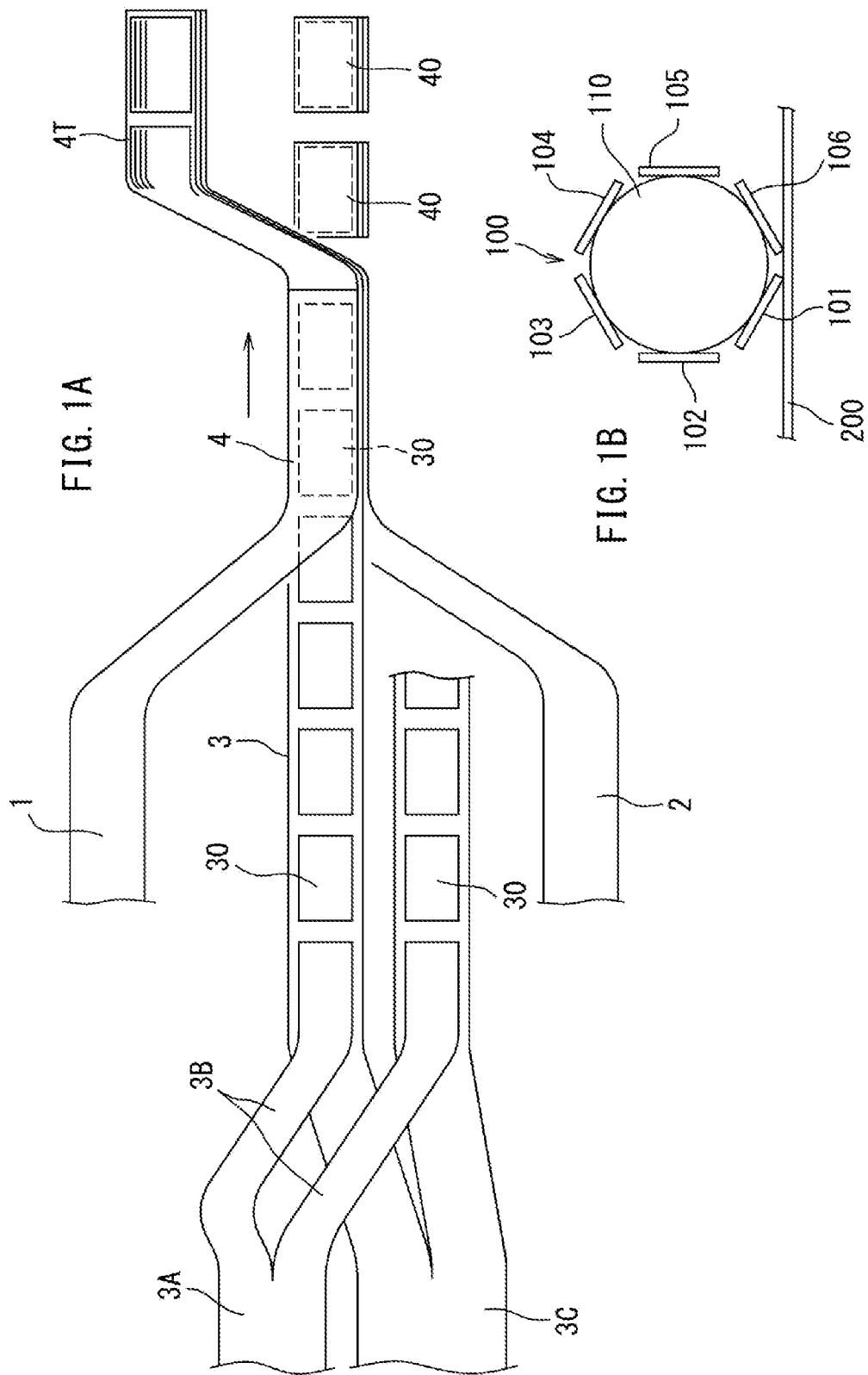
FIG. 1A is a schematic perspective view showing a summary of a card manufacturing method concerning an embodiment of the present invention.
FIG. 1B is a side view showing a pattern printing method.

In the case of a three-layer card in which an inlay is sandwiched between a front sheet and a back sheet (i.e., there is a second continuous sheet that is to be a back sheet), the present invention preferably includes a step of feeding a second continuous sheet 2 having a plurality of (a group of) different patterns repeatedly printed on the second continuous sheet 2, the plurality of different patterns seen as one cycle as a whole;
  a step of producing the laminated sheet 4 by laminating the second continuous sheet 2 on the reference sheet 3;
  a step of detecting a position of each one of the repeatedly printed different patterns by detection means; and
  a second adjustment step of adjusting such that the different patterns are at predetermined positions with respect to the reference sheet 3 by controlling a feeding speed of the second continuous sheet 2 according to a detection result on the positions of the different patterns,
  the second adjustment step being performed for each cycle made up of the plurality of different patterns.

In this case, it is easy to control a pattern adjustment of the second continuous sheet 2, and is possible to manufacture cards at high-speed.

Preferably, a cutting position at the time of producing the card is adjusted according to the position of each one of the plurality of patterns or each one of the plurality of different patterns.

In this case, it is possible to cut out a card depending on the pattern position.

Note that the registration mark may be cut and removed during the card production.

More specifically, the method of the present invention includes a step of discriminating (recognizing) a mark by the detection means, the mark being provided for each unit (corresponding to one card) on each of the first and second continuous sheets, wherein:

the first or second adjustment step is not performed if the number of the recognized marks is less than a predetermined number n equivalent to the one cycle and the first or second adjustment step is performed every time the number of the recognized marks reaches the predetermined number n.

In this case, the adjustment step is performed at every number n (one cycle of printing). Thus, it is efficient to adjust patterns.

Preferably, the adjustment step is performed by an actuator 83 driving a first dancer roll 81 that the first continuous sheet 1 winds around and a second dancer roll 82 that the second continuous sheets 2 winds around before the first and second continuous sheet 1, 2 being laminated on the reference sheet 3.

As in this case where the dancer roll is controlled by the actuator 83, it is easy to control a feeding amount of the first continuous sheet 1 or that of the second continuous sheet 2. In other words, control of the feeding speed of these sheets is easy.

Preferably, if a misalignment of the first or second continuous sheet 1, 2 with respect to the reference sheet 3 exceeds a predetermined allowable range ±Δ and is within a first misalignment range ±Δ1 as a result of the detection, the first or second adjustment step is performed by displacing the first or second dancer roll 81, 82 by a predetermined first certain amount T1 in a direction to reduce the misalignment.

A feed-back control is generally performed based on a variable amount corresponding to a misalignment amount. As the paperboard forming front and back sheets of a card is rigid and has a small amount of elongation to tensile force. Thus, if a feeding amount increases rapidly, conveyance may not work smoothly at nip rolls where the sheets are fed.

In the present invention, the first certain amount T1 is set in advance, so it is possible to control the feeding speed with smooth conveyance.

Here, the first certain amount T1 may be set in a range defined, for example, by Expression (110) below.

$$\Delta < (T1)/2 < \Delta 1 \quad (110)$$

In the case where m number of dancer rolls are provided to each continuous sheet, the first certain amount T1 may be set by Expression (120) below.

$$\Delta < (T1)/2m < \Delta 1 \quad (120)$$

Preferably, if the misalignment of the first or second continuous sheet 1, 2 with respect to the reference sheet 3 is within the predetermined allowable range ±Δ as a result of the detection, the first or second dancer roll 81, 82 is finely moved by the actuator 83 in a direction opposite to a previous moving direction in the first or second adjustment step.

When the dancer roll is finely moved as in this case, tension and bending of the first (or second) continuous sheet 1 (2) slightly changes while the feeding speed does almost not change. Thus, it is possible to bring the dancer roll to its home position with keeping the misalignment in the allowable range ±Δ.

Here, "dancer roll is finely moved" means "the movement amount of the dancer roll is at least within the allowable range ±Δ and is smaller than the first certain amount T1".

More preferably, if the misalignment of the first or second continuous sheet 1, 2 with respect to the reference sheet 3 exceeds the first misalignment range ±Δ1 as a result of the detection, the first or second adjustment step is performed by displacing the first or second dancer roll 81, 82 by a second certain amount T2 more than the first certain amount T1 in the direction to reduce the misalignment.

In the time of starting operation when the misalignment amount is large, it is possible to control feeding with smooth conveyance as mentioned above by moving the dancer roll by the second certain amount T2 larger than the first certain amount T1.

Any feature illustrated and/or depicted in conjunction with one of the aforementioned aspects or the following embodiments may be used in the same or similar form in one or more of the other aspects or other embodiments, and/or may be used in combination with, or in place of, any feature of the other aspects or embodiments.

Embodiments

The present invention will be understood more clearly from the following description of preferred embodiments taken in conjunction with the accompanying drawings. Note however that the embodiments and the drawings are merely illustrative and should not be taken to define the scope of the present invention. The scope of the present invention shall be defined only by the appended claims. In the accompanying drawings, like reference numerals denote like components throughout the plurality of figures.

An embodiment of the present invention will now be described with reference to the drawings.

Structure of a card is explained before an explanation of the embodiment.

Figure 5A:
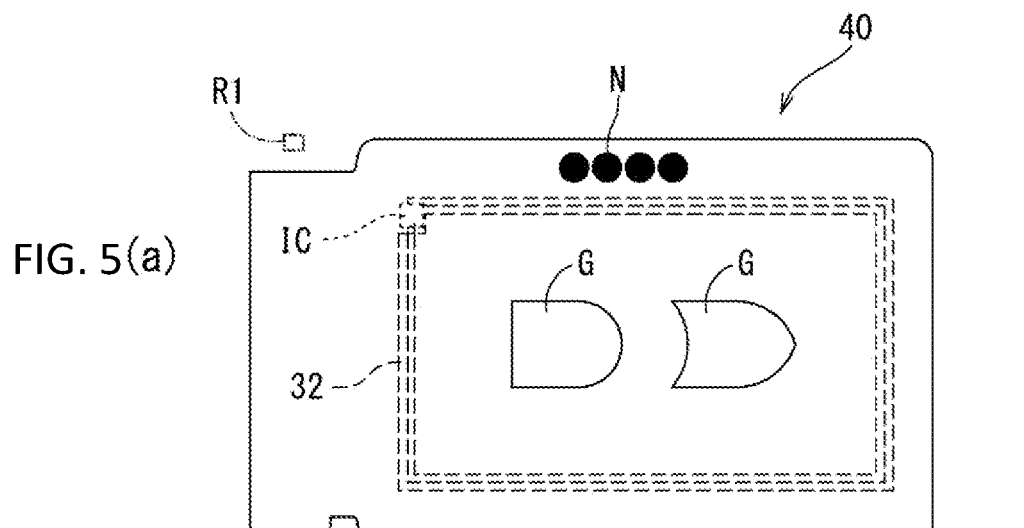
FIG. 5 (a) is a front view of a card, FIG. 5 (b) is a cross view of the card, and FIG. 5 (c) is a front view of a multi-row inlay.
Figure 5B:
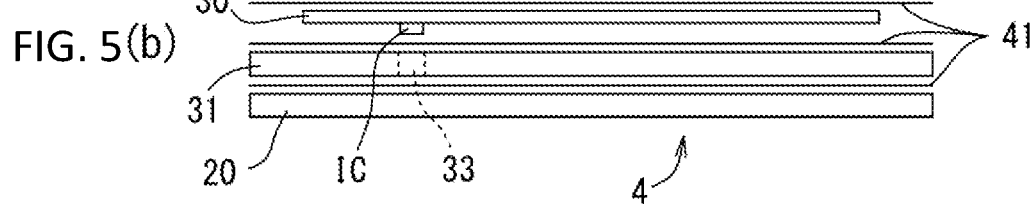
Figure 5C:
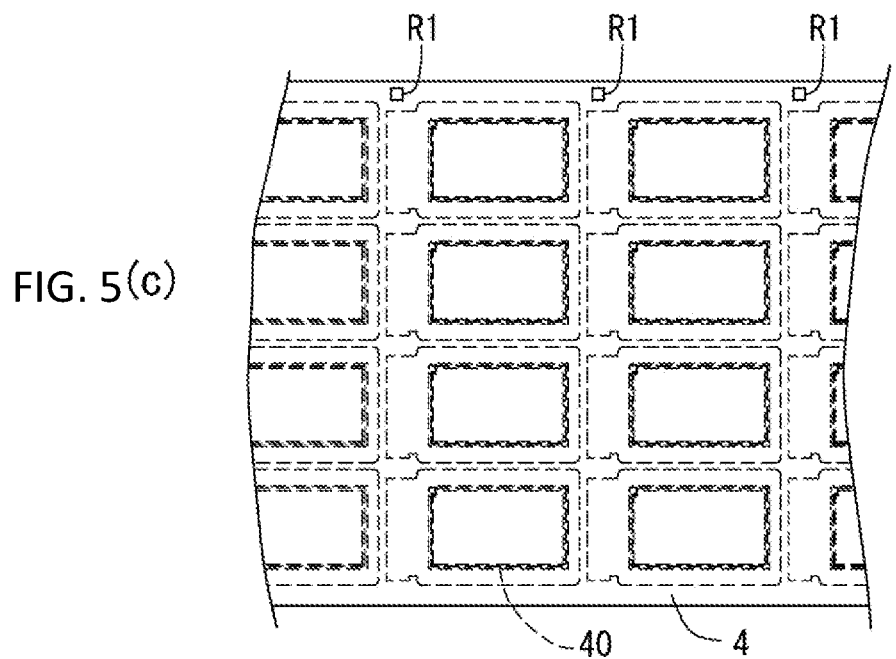

FIGS. 5 (*a*) and (*b*) show an example of a card 40.

As shown in these figures, the card 40 is formed by laminating layers: a front sheet 10; a back sheet 20; an inlay 30; and fine paper 31. These layers are adhered together by adhesive layers 41 made of, for example, polyurethane hot-melt adhesive.

The inlay 30 is provided with an IC chip and an antenna 32. In the fine paper 31, a through hole 33 is formed, in which the IC fits.

A name N of the card and a pattern G are printed on the front sheet 10 while another pattern (not shown) is printed on the back sheet 20. These patterns are repeatedly printed by a printing machine 100 (FIG. 1B) wherein the number n of patterns is seen (counted) as one cycle. The pattern may be only letters and registration marks.

As shown in FIG. 5 (*c*), an individual card is produced from a laminated sheet 4. The laminated sheet 4 is configured of a first continuous sheet that is to be the front sheet 10 of FIG. 5 (*b*), a second continuous sheet that is to be the back sheet 20, the inlays 30, and a continuous sheet of the fine paper 31. The laminated sheet 4 of FIG. 5 (*c*) is cut in lengthwise and crosswise to produce the card 40 of FIG. 5 (*a*).

Figure 4A:
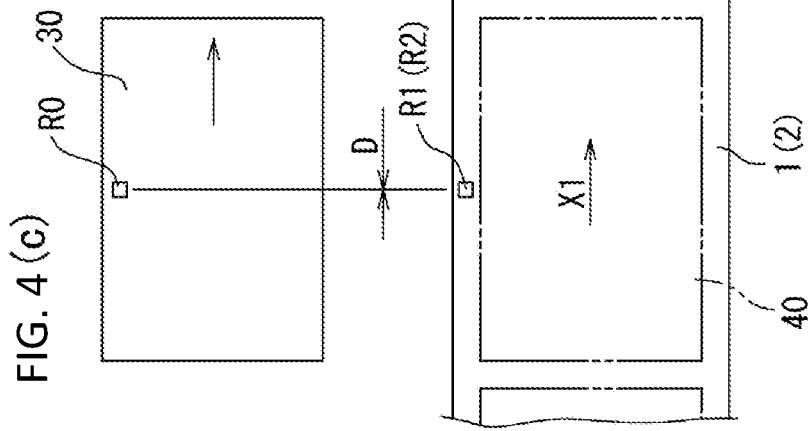
FIGS. 4(a), 4(b) and (4c) (collectively referred to as "FIG. 4" herein) represent a front view showing a concept of misalignment.
Figure 4B:
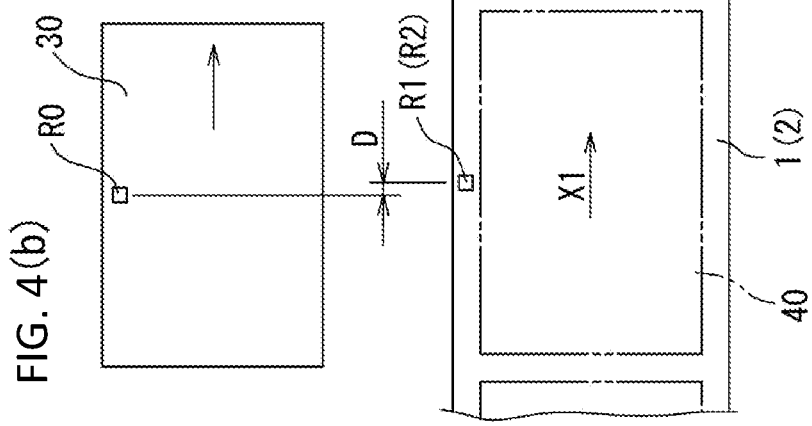
Figure 4C:
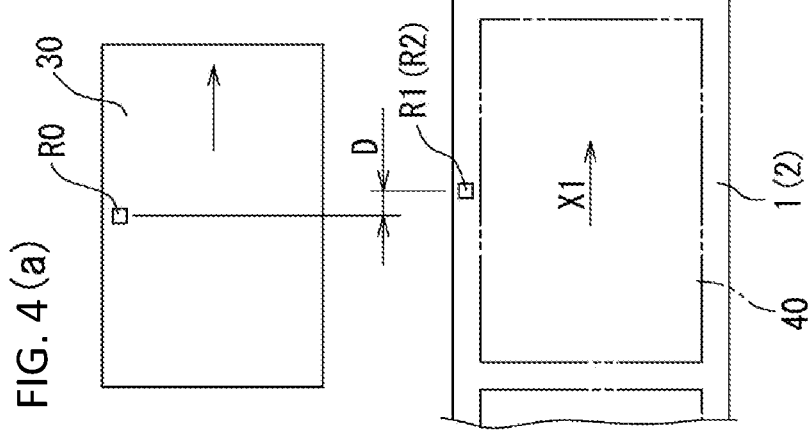

The first and second sheets and the inlay 30 are provided with respective marks R0 to R2 of FIG. 4 used for positional adjustment. The mark is called Registration mark. In this embodiment, the registration marks R0 to R2 are positioned in the center of the respective sheets in the carrying direction for the sake of explanation. However, the marks may be positioned at a corner as shown in FIG. 5 (a) and trimmed after lamination in the case of the front sheet 10 of FIG. 5.

Summary of the card manufacturing method will be described below.

For the sake of drawing a figure, FIG. 1A shows the case where the first and second continuous sheet 1, 2 each have a width equivalent to a width of a single card.

In FIG. 1A, a multi-row inlay 3A (the inlays 30 are continuous lengthwise and crosswise) and a continuous paper 3C of the fine paper 31 are slit into multiple single rows while conveyed. The slit single-row inlay 3B is cut into an individual card unit, and then each inlay 30 is attached to the continuous paper 3C of the fine paper to produce an intermediate sheet (a reference sheet) 3.

On the front side and the back side of the intermediate sheet 3, the first continuous sheet 1 and the second continuous sheet 2 are attached, respectively. As a result, the laminated sheet 4 is produced in which a to-be card 40 (FIG. 5(a)) is repeatedly shown. Thereafter, the laminated sheet 4 is cut into a unit of the individual card 40.

Next, the outline of a manufacturing apparatus is explained together with an example of a manufacturing method.

Figure 2:
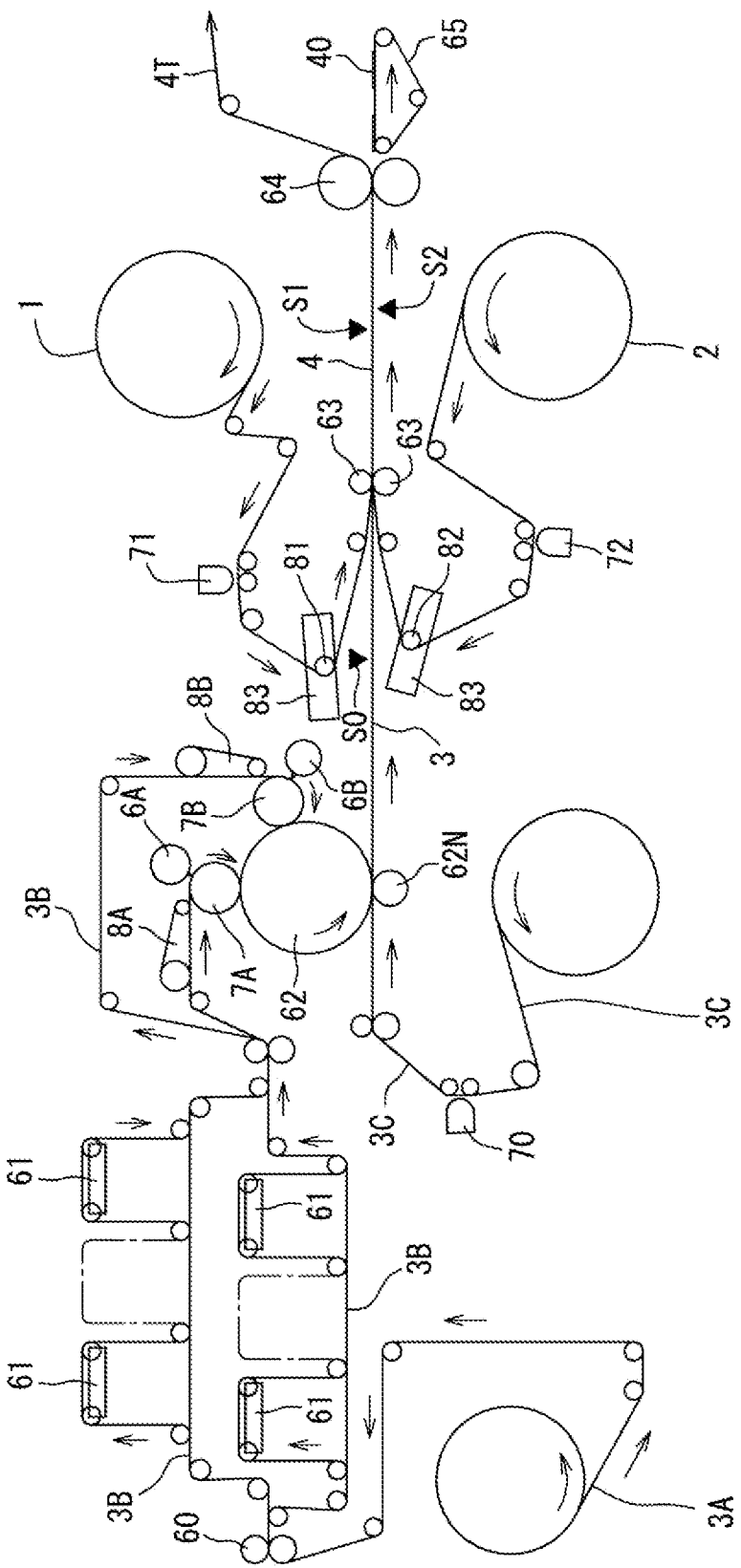
FIG. 2 is a schematic layout diagram showing an apparatus used for the manufacturing method.

As shown in FIG. 2, the first and second continuous sheets 1 and 2, the multi-row inlay 3A, the continuous paper 3C where the fine paper 31 (FIG. 5 (c)) is continuous are unwound from a corresponding drum.

The multi-row inlay 3A of FIG. 2 is unwound from the drum, and slit into the multiple single-row inlays 3B by a slitter 60. Thereafter, the slit single-row inlays 3B are apart from each other in the width direction by a guider 61.

Then, the single-row inlays 3B are cut into a unit of the individual card by a first cutter 6A and a second cutter 6B. For example, the first and second cutters 6A and 6B contact respective first and second anvils 7A and 7B, and cut the corresponding single-row inlay 3B into a unit of the individual card. At upstream of the cutters and the anvils, first and second suction conveyers 8A and 8B are provided, which intermittently feed the single-row inlay 3B.

On a placement drum 62, the rectangular inlays 30 (FIG. 5 (a)) are intermittently conveyed at a fixed pitch.

On the other hand, the continuous paper 3C of the fine paper 31 (FIG. 5 (c)) is unwound from the drum. The continuous paper 3C is provided with adhesive by an applicator 70, and then is fed to the placement drum 62. At the gap between the placement drum 62 and a nip roll 63, the placement drum 62 produces the intermediate sheet (the reference sheet) 3 in which the inlays are intermittently placed on the continuous sheet 3. The intermediate sheet 3 is fed to the gap between nip rolls 63 and 63 at downstream. Generally, one of the nip rolls 63, 63 is driven by a drive roll.

As described below, the first and second continuous sheets 1 and 2 are continuously fed to the nip rolls 63 before bonding. The first and second continuous sheets 1 and 2 are unwound from the respective drums, and the applicator 71, 72 apply adhesive on their back surfaces. The back surface is opposite side of a front surface, where prescribed patterns are repeatedly printed.

After the application of adhesive, the first and second continuous sheets 1 and 2 are respectively fed to first and second dancer rolls 81 and 82 at downstream, and are fed to the nip rolls 63 via these dancer rolls. The dancer rolls 81 and 82 each are reciprocated by an actuator 83 such as a servo motor to adjust a feeding speed of the continuous sheet 1 and 2 to the nip rolls 63.

The continuous sheets 1, 2 and the intermediate sheet 3 that are fed to the nip rolls 63, 63 are bonded together at the nip rolls 63, 63 to produce the laminated sheet 4. The laminated sheet 4 is fed to a trim cutter 64, and is separated into individual cards 40 and a lattice (frame) shape trim sheet 4T. The cards 40 are intermittently and continuously ejected onto a belt conveyor 65, and conveyed.

Next, a control system of the present manufacturing method is described below.

As shown in FIG. 2, a sensor S0 for detecting the registration mark R0 (FIG. 4) on the inlay 30 is provided at upstream of the nip rolls 63. Meanwhile, sensors S1 and S2 for detecting the respective registration marks R1 and R2 (FIG. 4) on the first and second continuous sheets 1 and 2 are provided at downstream of the nip rolls 63.

The first and second continuous sheets 1 and 2 are different in their patterns, but it is essentially the same for the structure in which both sheets are laminated on the intermediate sheet 3; the lamination method; and the way of control. Thus, the case where the first continuous sheet 1 is laminated on the intermediate sheet 3 is representatively described below while the description of the case where the second continuous sheet 2 is laminated on the intermediate sheet 3 is omitted.

FIG. 3 shows a schematic diagram of the control system.

As shown in this diagram, a detection output from each sensor S0 to S2 is applied to a control device 5. The control device 5 is configured of a computer.

The control device 5 includes: a calculation unit such as a mark recognition section 50 and a counter 51; and a storage unit that stores a threshold for a misalignment discriminator 52 and drive amounts 53 for dancer rollers. To the control device 5, an indicator 54 and an operation part 55 are connected.

As described below, a part of the control device 5 and each sensor S0 to S2 configure a detection means for detecting a position of a pattern through a position of the registration mark.

The mark recognition section 50 detects the registration marks R0 to R2 by receiving a signal from respective sensors S0 to S2. The counter 51 calculates what number of each registration mark R0 to R2. When the number of each registration mark reaches a predetermined quantity, the counter 51 has the misalignment discriminator 52 judge the degree of misalignment, as descried below.

The misalignment amount D is divided into three levels: the case where the amount exceeds a first misalignment range ±Δ1 as shown in FIG. 4 (a), the case where the amount exceeds an allowable range ±Δ while is within the first misalignment range ±Δ1 as shown in FIG. 4 (b), and the case where the amount is within the allowable range ±Δ as shown in FIG. 4 (c).

The misalignment amount D and the control thereof are explained with reference to FIG. 4. In FIG. 4, for the sake of explanatory convenience, the registration marks R0 to R2 are placed on the center of the corresponding sheet in the carrying direction. The rectangular defined by a two-dot chain line in FIG. 4 shows a card 40 that is cut out afterward.

As shown in FIG. 4 (a) where the misalignment amount D is large (i.e., the case where the misalignment amount D exceeds a predetermined first misalignment range ±Δ1), the control device 5 reads out an amount T2 as a drive amount, and moves the dancer roll 81 (82) by the amount T2 (e.g., 2 mm) in a direction opposite to the misalignment direction. With this control, the large misalignment is greatly corrected. This control may continue until the operating condition becomes stable.

When the misalignment amount D is small as shown in FIG. 4 (b) (i.e., the case where the misalignment amount D exceeds a predetermined allowable range ±Δ while is within the first misalignment range ±Δ1), the control device 5 of FIG. 3 reads out an amount T1 as a drive amount, and moves the dancer roll 81 (82) by the amount T1 (e.g., 1 mm) in a direction opposite to the misalignment direction. As a result, the misalignment is slightly corrected.

When the misalignment amount D is tiny as shown in FIG. 4 (c) (i.e., the case where the misalignment amount is within the predetermined allowable range ±Δ), the control device 5 of FIG. 3 reads out an amount T as a drive amount, and moves the dancer roll 81 (82) by a minuscule amount in a direction opposite to the direction in which the dancer roll 81 (82) moved in the previous misalignment control. As a result, it may be possible to bring the dancer roll 81 (82) to its home position.

Next, a method for producing the card 40 from the sheets 1 to 3 of FIG. 2.

As shown in FIG. 3, the reference sheet 3 and the first continuous sheet 1 are fed to the nip rolls 63. The reference sheet 3 is to be a basis for positional adjustment. On the continuous sheet 1, predetermined patterns are repeatedly printed. The nip rolls 63 laminate the first continuous sheet 1 on the reference sheet 3 to produce the laminated sheet 4.

In a step before the lamination, the control device 5 recognizes the registration mark R0 (FIG. 4) printed on the single-row inlay 3B by receiving a signal from the sensor S0 to detect the presence of the registration mark. On the other hand, in a step after the lamination, the control device 5 recognizes the pattern (i.e., the registration mark) printed on the first continuous sheet 1 by receiving a signal from the sensor S1 to detect the presence of the registration mark.

The control device 5 judges if the number of the registration marks reaches a predetermined one cycle. When the number of recognized registration marks is less than a predetermined number n that corresponds to the one cycle, the adjustment step is not performed. The adjustment step is performed at every time when the number of recognized registration marks reaches the predetermined number n. That is, at every cycle, the control device 5 performs the first (second) adjustment step by controlling a feeding speed of the first continuous sheet 1 (the second continuous sheet 2) of FIG. 4 based on the detection result, wherein the position of the registration mark R1 (R2) of the first continuous sheet 1 (the second continuous sheet 2) is adjusted to a predetermined position with respect to the registration mark R0 of the reference sheet 3.

When the misalignment of the first (or second) continuous sheet 1 (2) with respect to the reference sheet 3 (FIG. 3) exceeds the first misalignment range ±Δ1 based on the detection result, the control device 5 of FIG. 3 performs the first (or second) adjustment step, wherein the control device 5 moves the dancer roll 81 (82) by the amount T2 larger than the predetermined first amount T1 in a direction that the amount of misalignment is reduced, thereby changing the feeding amount of the first (or second) continuous sheet 1 (2).

For example, in the case where the registration mark R1 (R2) of the first (or second) continuous sheet 1 (2) misaligns in large (larger than the first misalignment range ±Δ1) with respect to the registration mark R0 of the inlay 30 in downstream X1 of the carrying direction, the control device 5 moves the dancer roll 81 (82) by, for example, 2 mm (a fixed amount) in upstream opposite to the downstream X1.

That is, before laminating the first (or second) continuous sheet 1 (2), the dancer roll 81 (82) that the first (or second) continuous sheet 1 (2) winds around is driven by the actuator 83, and the dancer roll is pulled in the direction that the misalignment amount D is reduced. As a result, the misalignment amount D becomes small. By repeating this control, the misalignment amount D will gradually be smaller than the first misalignment range ±Δ1 (FIG. 3).

On the other hand, in the case where the misalignment amount D of the first (or second) continuous sheet 1 (2) with respect to the reference sheet 3 (FIG. 3) exceeds a predetermined allowable range ±Δ while is within the first misalignment range ±Δ1, the control device 5 of FIG. 3 performs the first (or second) adjustment step, wherein the control device 5 moves the dancer roll 81 (82) by the predetermined first certain amount T1 in a direction that the amount of misalignment is reduced, there by changing a feeding amount of the first (or second) continuous sheet 1 (2).

For example, as shown in FIG. 4 (b), in the case where the registration mark R1 (R2) of the first continuous sheet 1 (or the second continuous sheet 2) slightly misaligns with respect to the registration mark R0 of the inlay 30 in downstream X1 of the carrying direction, the control device 5 of FIG. 3 moves the dancer roll 81 (82) by, for example, 1 mm (a fixed amount) in upstream opposite to the downstream X1.

As a result, the slight misalignment becomes smaller by the same driving of the dancer roll as mentioned before. By repeating this control, the misalignment amount D will gradually be smaller than the allowable range ±Δ.

In another case, as shown in FIG. 4, where the misalignment of the first (or second) continuous sheet 1 (2) with respect to the reference sheet 3 (FIG. 3) is within the predetermined allowable range ±Δ based on the detection result, the actuator 83 moves the dancer roll 81, 82 by a tiny amount T in a direction opposite to a direction in which dancer roll of FIG. 3 previously moved in an adjustment step.

For example, as shown in FIG. 4 (c), the registration mark R1 (R2) of the first continuous sheet 1 (or the second continuous sheet 2) is almost not misaligned with respect to the registration mark R0 of the inlay 30, the control device 5 moves the dancer roll 81 (82) of FIG. 3 by, for example, a tiny amount T (a fixed amount) in a (downstream) direction X1 opposite to a (upstream) direction in which the dancer roll previously moved.

In this case, the misalignment amount D does almost mot change due to the looseness of the sheet. On the other hand, with this control repeated, the dancer roll 81 (82) becomes closer to its home position, and it is possible to prevent the dancer roll 81 (82) from being largely displaced with respect to its home position.

After the lamination, a position of the patterns is recognized based on the detection signal from the sensor S0, S1, or S2 of FIG. 2; the rotation of a trim cutter 64 is controlled based on the position of the patterns; and a cut position for producing the card 40 is controlled.

In the inlay 30 and the sheet shown in FIG. 4, the registration marks R0 to R2 may be trimmed and removed when the card 40 is cut out as shown in FIG. 5 (a).

There is a case where the registration mark R0 of the inlay 30 of FIG. 4 and the registration mark R1 (R2) of the first continuous sheet 1 (or the second continuous sheet 2) are put on a card 40 at different positions with each other. In this case, the positional difference is input in the control device 5 before performing the aforementioned adjustment steps.

As shown in FIG. 2, the sensor S0 and the sensors S1 and S2 are apart from each other in the carrying direction X. Thus, a detection of the registration mark for one specific card 40 is different in timing between the sensor S0 and the sensors S1, S2. Therefore, it needs to consider the timing difference for controlling the dancer roll.

The position adjustment of each sheet may be carried out by controlling its tension.

While preferred embodiments have been described above with reference to the drawings, obvious variations and modifications will readily occur to those skilled in the art upon reading the present specification.

For example, a card may be produced by bonding two sheets.

A card to be produced may be a contact-type card.

Thus, such variations and modifications shall fall within the scope of the present invention as defined by the appended claims.

INDUSTRIAL APPLICABILITY

The present invention is applicable to a card manufacturing method for various types of card as a cash card.

REFERENCE SIGNS LIST

1: First continuous sheet
10: Front sheet
2: Second continuous sheet
20: Back sheet
3: Intermediate sheet (Reference sheet)
3A: Multi-row inlay
3B: Single-row inlay
3C: Continuous paper
30: Inlay
31: Fine paper
32: Antenna
33: Through hole
4: Laminated sheet
4T: Trim sheet
40: Card
41: Adhesive layer
5: Control device (Detection means)
50: Mark recognition section
51: Counter
52: Misalignment discriminator
53: Drive amount
54: Indicator
55: Operation part
6A: First cutter
6B: Second cutter
60: Slitter
61: Guider
62: Placement drum
63: Nip roll
64: Trim cutter
65: Belt conveyer
7A: First anvil
7B: Second anvil
70, 71, 72: Applicator
8A: First suction conveyer
8B: Second suction conveyer
81: First dancer roll
82: Second dancer roll
83: Actuator
100: Printing machine
G: Pattern
N: Card name
R0, R1, R2: Registration mark
S0, S1, S2: Sensor (Detection means)
T: Tiny amount
T1: First certain amount
T2: Second certain amount
X: Carrying direction
X1: Downstream
X2: Upstream
±Δ: Allowable range
±Δ1: First misalignment range

The invention claimed is:

1. A card manufacturing method, comprising:
a step of feeding a reference sheet serving as a reference for alignment;
a step of feeding a first continuous sheet having a plurality of patterns, as one cycle, repeatedly printed on the first continuous sheet;
a step of producing a laminated sheet by laminating the first continuous sheet on the reference sheet;
a step of successively detecting a position of each one of the repeatedly printed patterns by detection means;
a first adjustment step of adjusting such that the patterns are at predetermined positions with respect to the reference sheet by controlling a feeding speed of the first continuous sheet according to a detection result on the positions of the patterns; and
a step of producing a card by cutting the laminated sheet for each of the patterns,
the first adjustment step being performed per the one cycle made up of the plurality of patterns.

2. The card manufacturing method according to claim 1, comprising:
a step of feeding a second continuous sheet having a plurality of different patterns, as one cycle, repeatedly printed on the second continuous sheet;
a step of producing the laminated sheet by laminating the second continuous sheet on the reference sheet;
a step of detecting a position of each one of the repeatedly printed different patterns by detection means; and
a second adjustment step of adjusting such that the different patterns are at predetermined positions with respect to the reference sheet by controlling a feeding speed of the second continuous sheet according to a detection result on the positions of the different patterns,
the second adjustment step being performed per the one cycle made up of the plurality of different patterns.

3. The card manufacturing method according to claim 2, wherein a cutting position at the time of producing the card is adjusted according to the position of each one of the patterns or the position of each one of the different patterns.

4. The card manufacturing method according to claim 2, comprising:
a step of recognizing a mark by the detection means, the mark being provided on each of the first and second continuous sheets, the mark being provided on per unit corresponding to the card wherein:
the first or second adjustment step is not performed if the number of the recognized marks is less than a predetermined number n equivalent to the one cycle, and
the first or second adjustment step is performed every time the number of the recognized marks reaches the predetermined number n.

5. The card manufacturing method according to claim 4, wherein:
before laminating the first or second continuous sheet on the reference sheet, an actuator drives a first dancer roll that the first continuous sheet winds around or a second dancer roll that the second continuous sheet winds around, thereby performing the first or second adjustment step.

6. The card manufacturing method according to claim 5, wherein:
if a misalignment of the first or second continuous sheet with respect to the reference sheet exceeds a predetermined allowable range and is within a first misalignment range as a result of the detection, the first or second adjustment step is performed by displacing the first or second dancer roll by a predetermined first certain amount in a direction to reduce the misalignment.

7. The card manufacturing method according to claim 6, wherein:
if the misalignment of the first or second continuous sheet with respect to the reference sheet is within the predetermined allowable range as a result of the detection, the first or second dancer roll is finely moved by the actuator in a direction opposite to a previous moving direction in the first or second adjustment step.

8. The card manufacturing method according to claim 6, wherein:
if the misalignment of the first or second continuous sheet with respect to the reference sheet exceeds the first misalignment range as a result of the detection, the first or second adjustment step is performed by displacing the first or second dancer roll by a second certain amount larger than the first certain amount in the direction to reduce the misalignment.

* * * * *